US010986719B2

(12) United States Patent
Hartung et al.

(10) Patent No.: US 10,986,719 B2
(45) Date of Patent: Apr. 20, 2021

(54) WIRELESS LAYERED SECURITY SYSTEM

(71) Applicant: HAMPTON PRODUCTS INTERNATIONAL CORPORATION, Foothill Ranch, CA (US)

(72) Inventors: James Hartung, Foothill Ranch, CA (US); Jon Fong Quan, Fountain Valley, CA (US); Hossein Molaie Shargh, Rancho Santa Margarita, CA (US); Tim Regan, Foothill Ranch, CA (US); Allen Huotari, Garden Grove, CA (US)

(73) Assignee: HAMPTON PRODUCTS INTERNATIONAL CORPORATION, Foothill Ranch, CA (US)

( * ) Notice: Subject to any disclaimer, the term of this patent is extended or adjusted under 35 U.S.C. 154(b) by 0 days.

(21) Appl. No.: 16/241,740

(22) Filed: Jan. 7, 2019

(65) Prior Publication Data
US 2019/0215936 A1 Jul. 11, 2019

Related U.S. Application Data

(60) Provisional application No. 62/614,231, filed on Jan. 5, 2018.

(51) Int. Cl.
*H04N 7/18* (2006.01)
*H05B 47/19* (2020.01)
(Continued)

(52) U.S. Cl.
CPC ....... *H05B 47/19* (2020.01); *G08B 13/19656* (2013.01); *H04B 7/15507* (2013.01);
(Continued)

(58) Field of Classification Search
CPC ............... H05B 33/08; H05B 33/0815; H05B 33/0842; H05B 33/0854; H05B 37/02;
(Continued)

(56) References Cited

U.S. PATENT DOCUMENTS 7,079,808 B2   7/2006   Striemer
7,162,258 B2   1/2007   Beach et al.
(Continued)

OTHER PUBLICATIONS

Sengled Boost Dimmable LED Light Bulb with Integrated Wi-Fi Repeater; Home Depot Online Catalogue; https://www.homedepot.com/p/Sengled-Boost-Dimmable-LED-Light-Bulb-with-Integrated-Wi-Fi-Repeater-A01-A60NAE26CL/206313284; Printed Jan. 4, 2019.

*Primary Examiner* — Jimmy T Vu
(74) *Attorney, Agent, or Firm* — Klein, O'Neill & Singh, LLP

(57) ABSTRACT

A security system for use with a wireless access point that is configured to transmit a first wireless signal within a predetermined transmission range includes an outdoor lighting fixture including a master wireless transceiver configured and located to receive the first wireless signal from the wireless access point and to re-transmit the first wireless signal beyond the predetermined transmission range; and a first peripheral device located and configured to receive the first wireless signal re-transmitted from the master wireless transceiver, and to transmit a second wireless signal to at least one of (a) the wireless access point via the master wireless transceiver, and (b) a second peripheral device.

5 Claims, 13 Drawing Sheets

(51) Int. Cl.
*H04B 7/155* (2006.01)
*H04W 84/20* (2009.01)
*G08B 13/196* (2006.01)
*H04L 29/06* (2006.01)
*H04B 7/26* (2006.01)

(52) U.S. Cl.
CPC ........... H04L 63/104 (2013.01); H04N 7/181 (2013.01); H04W 84/20 (2013.01); *H04B 7/2606* (2013.01); *H04N 7/18* (2013.01)

(58) Field of Classification Search
CPC ............ H05B 37/0227; H05B 37/0272; H05B 7/15507; H04L 63/104; H04N 7/181; H04W 84/20; G08B 13/19656
See application file for complete search history.

(56) References Cited

U.S. PATENT DOCUMENTS

| | | |
|---|---|---|
| 7,199,701 B2 | 4/2007 | Kates |
| 9,377,184 B2 | 6/2016 | Chang |
| 9,726,360 B1 | 8/2017 | Alexander et al. |
| 10,326,921 B2 * | 6/2019 | Chien .................. H04N 5/2256 |
| 2003/0210340 A1 * | 11/2003 | Frederick Romanowich .............. G08B 13/1966 348/272 |
| 2014/0078308 A1 | 3/2014 | Verfuerth |
| 2017/0127492 A1 * | 5/2017 | Underwood ........... H05B 47/11 |
| 2019/0347916 A1 * | 11/2019 | Wild .................... H04L 67/025 |

* cited by examiner

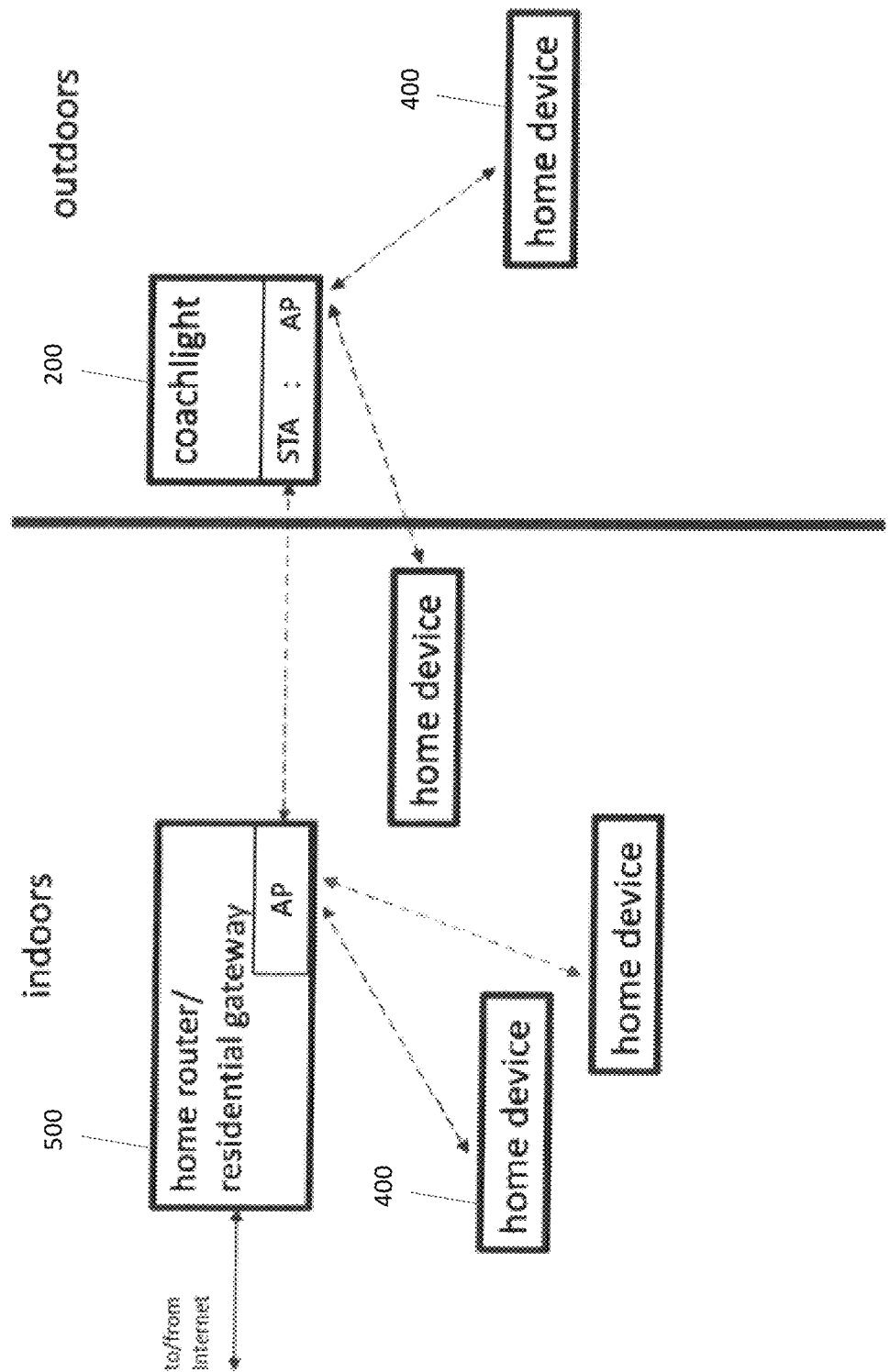
FIG. 4 : Coachlight as Wi-Fi Extender (indoors to outdoors)

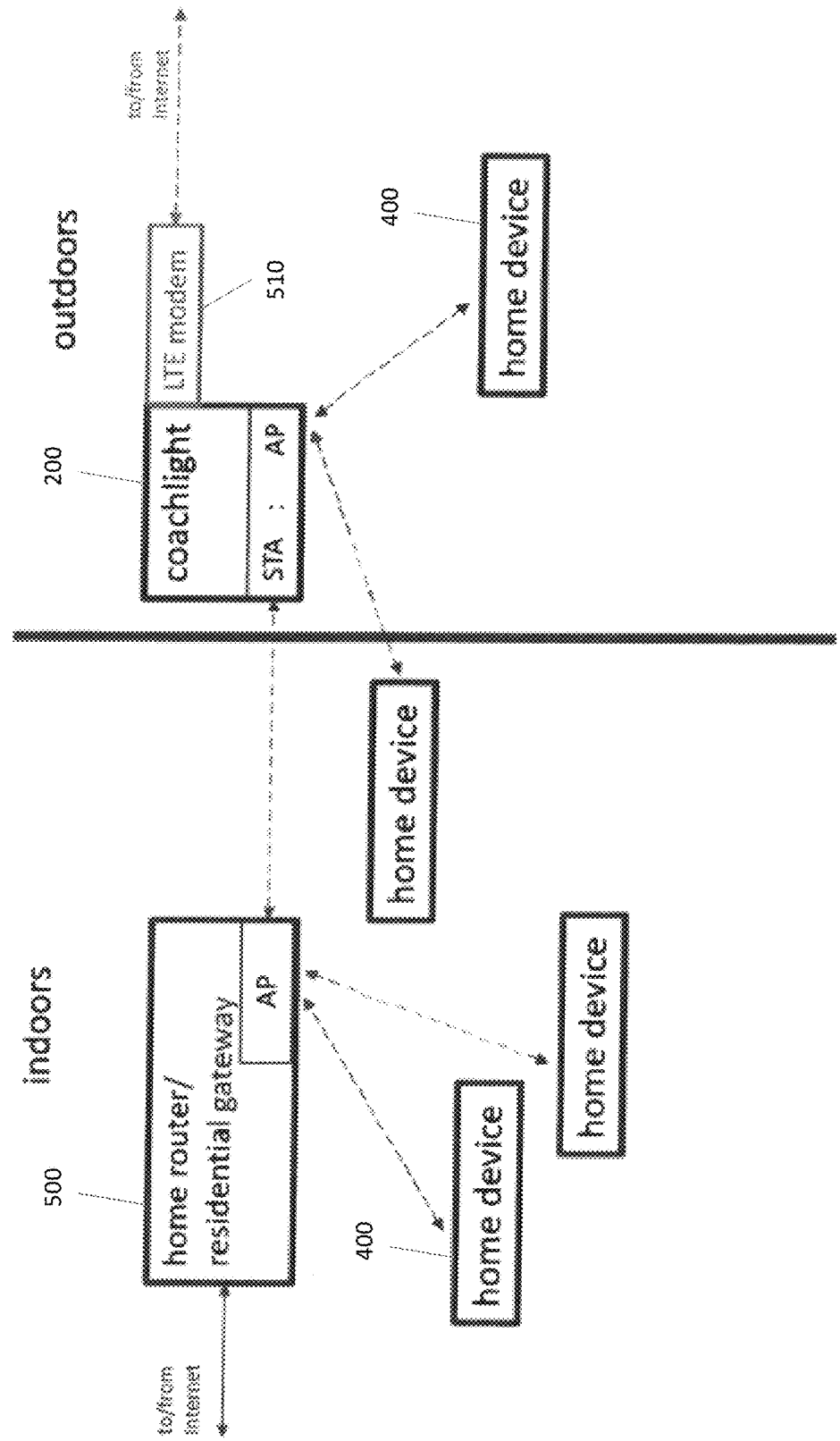
FIG. 5: Coachlight as Wi-Fi Extender plus "home hotspot" Always Best Connected and/or Always Best Path (to/from Internet) and/or Multiple Paths (to/from Internet) e.g., Inverse Multiplexing

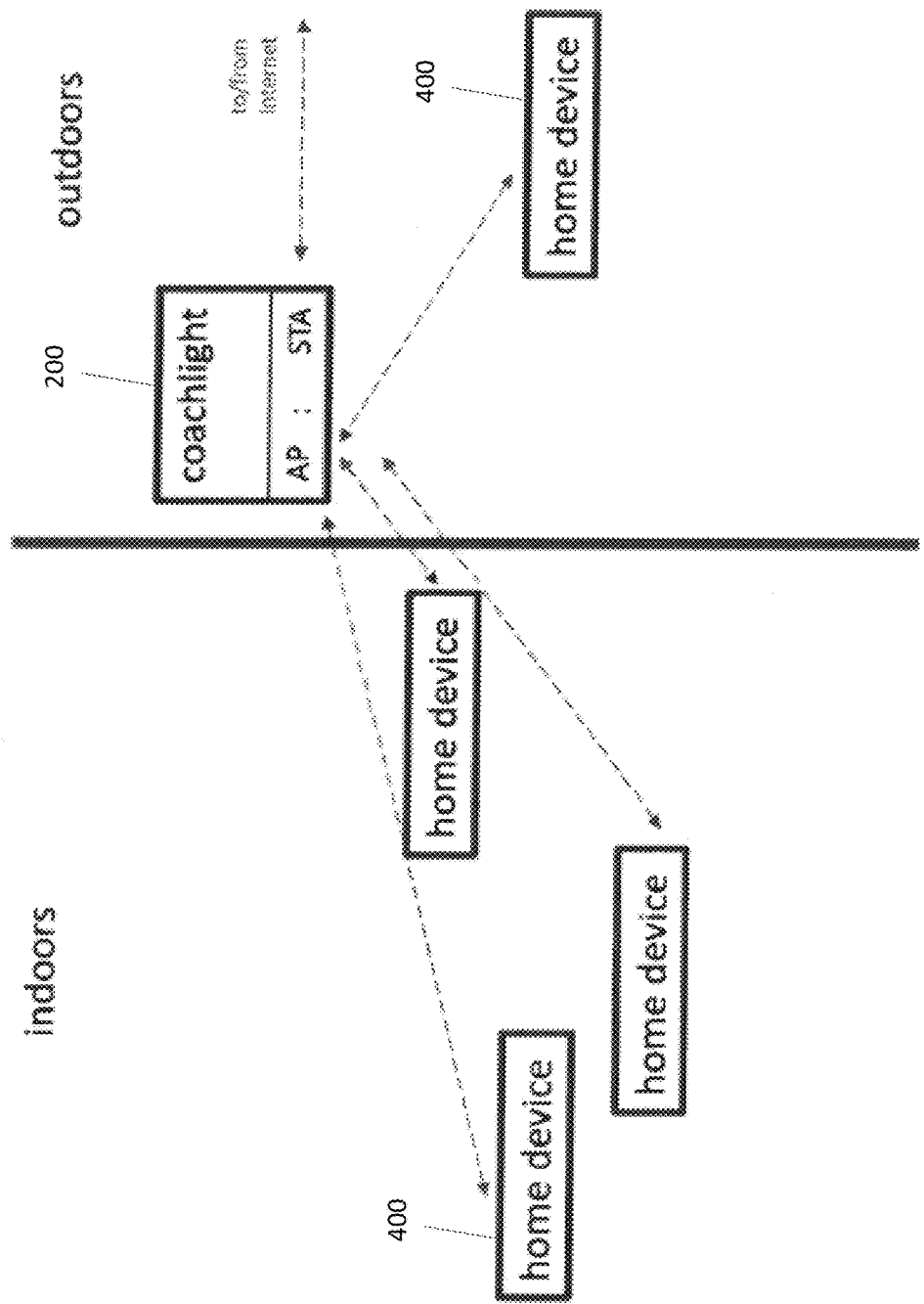
FIG. 6: Coachlight as Wi-Fi Extender for Wi-Fi outdoor service (community Wi-Fi e.g., Terragraph, Starry, etc.)
NOTE: Coachlight could be used "as is" for an outdoors to indoors extension

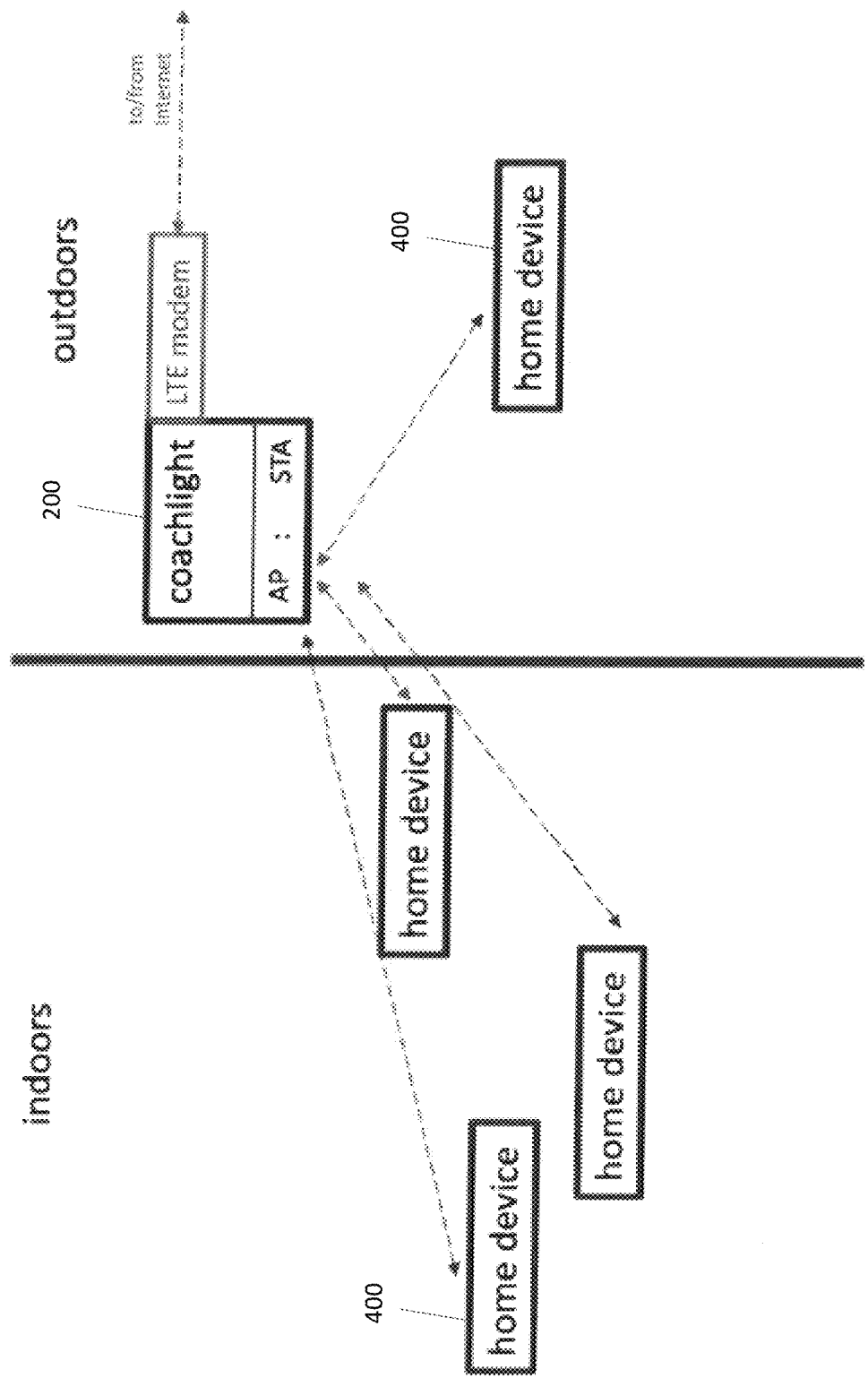
FIG. 7: Coachlight as LTE Gateway
NOTE: if Coachlight has battery backup then this can also be failover use case

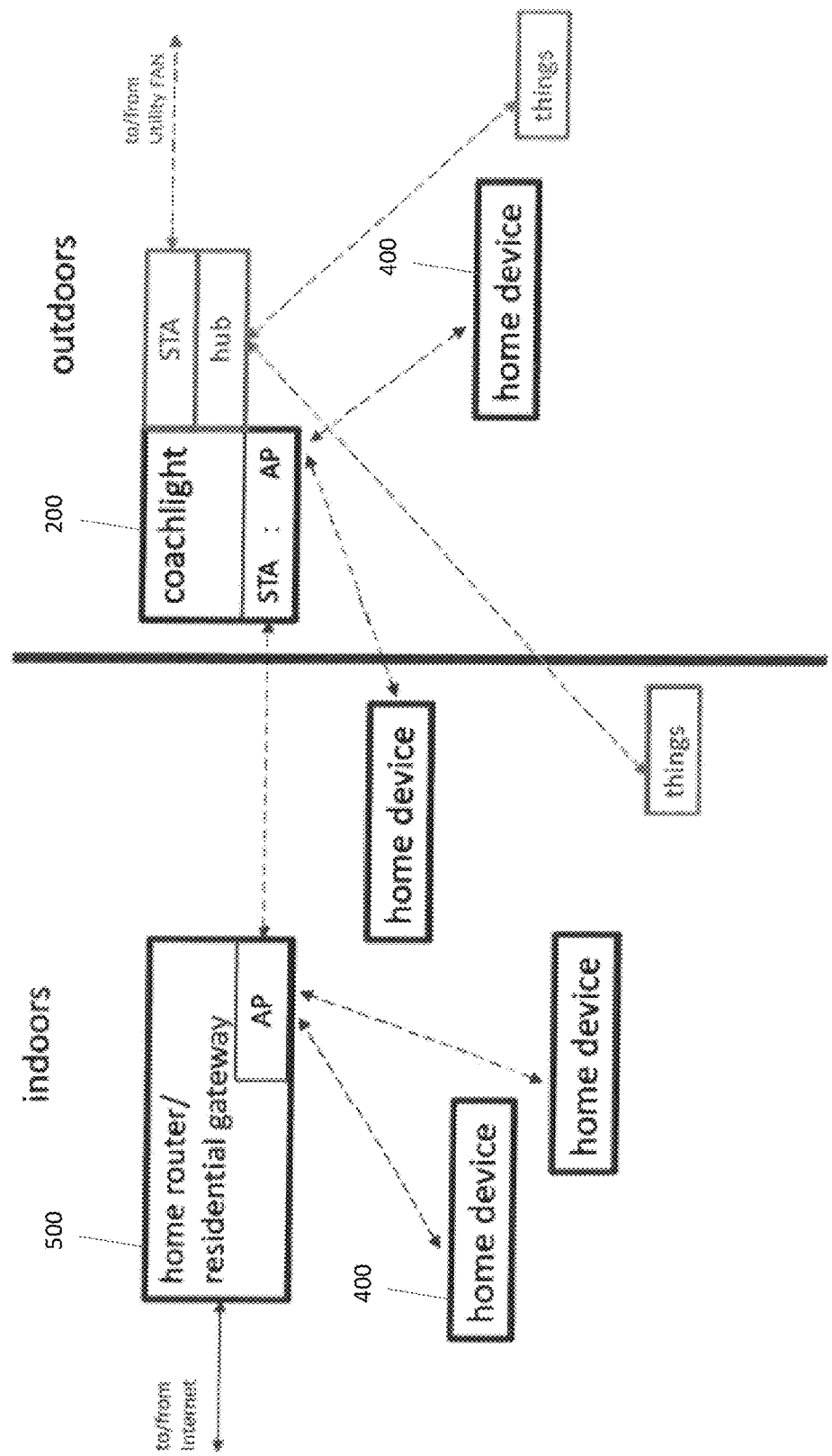
FIG. 8: Coachlight as Wi-Fi Extender plus "utility field area network (FAN) option"
NOTE: the STA could be almost any low power WAN (LPWAN) interface (NB-IoT, LTE-M, HaLOW (802.11ah), LoraWAN, etc.) The hub could include any PAN (Bluetooth, Z-Wave, Zigbee) or could include HaLOW. Utility = gas, electricity, water, lighting...

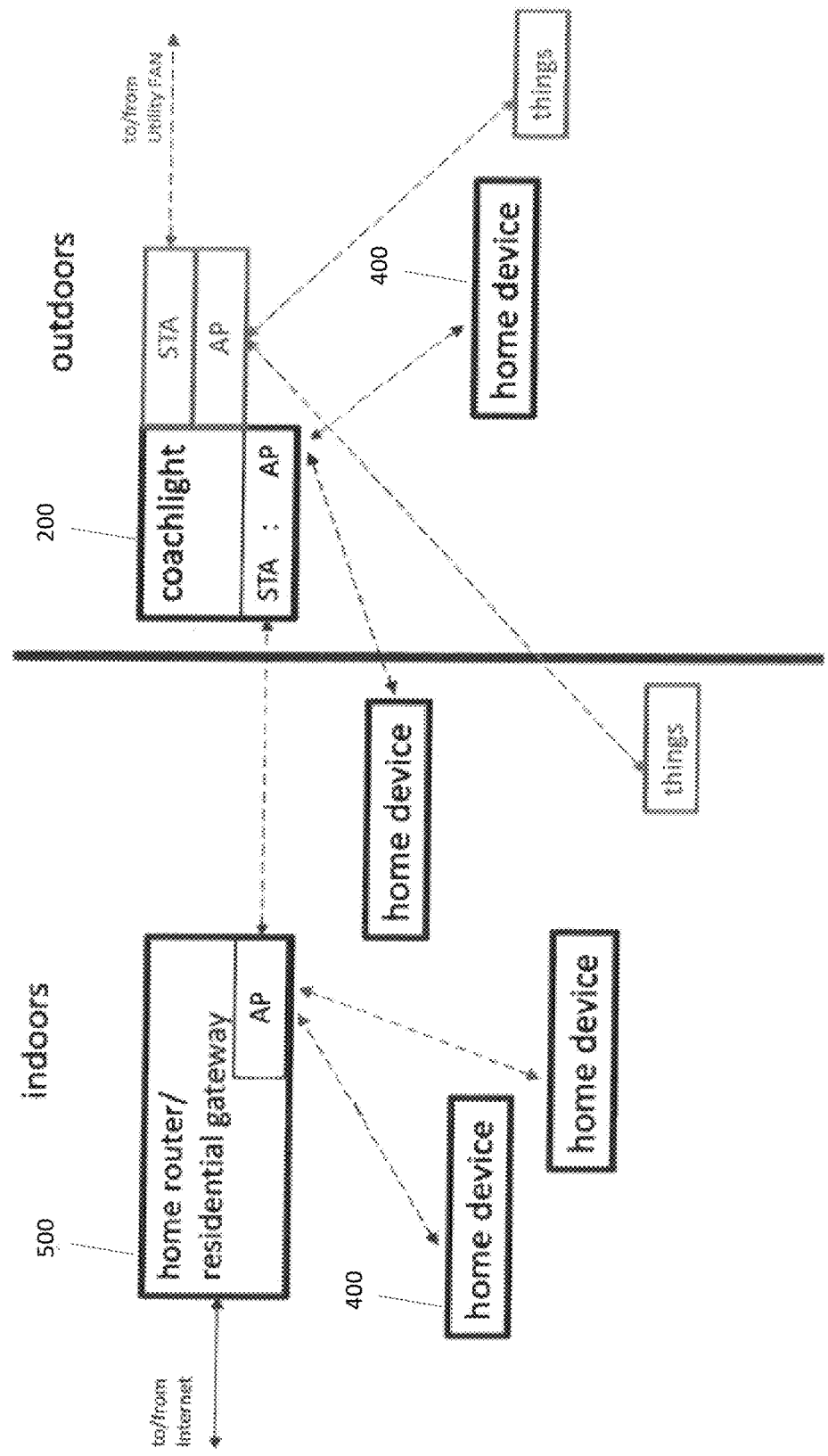
FIG. 9: Coachlight as Wi-Fi Extender plus *"LPWAN extender"*
NOTE: The new radios have similar technologies, e.g., the STA and AP should either be licensed and unlicensed LTE respectively or HaLOW (802.11ah) and "other" Wi-Fi respectively. Effectively the Coachlight provides an indoors to outdoors extension (per original use case) and an outdoors to indoors extension.

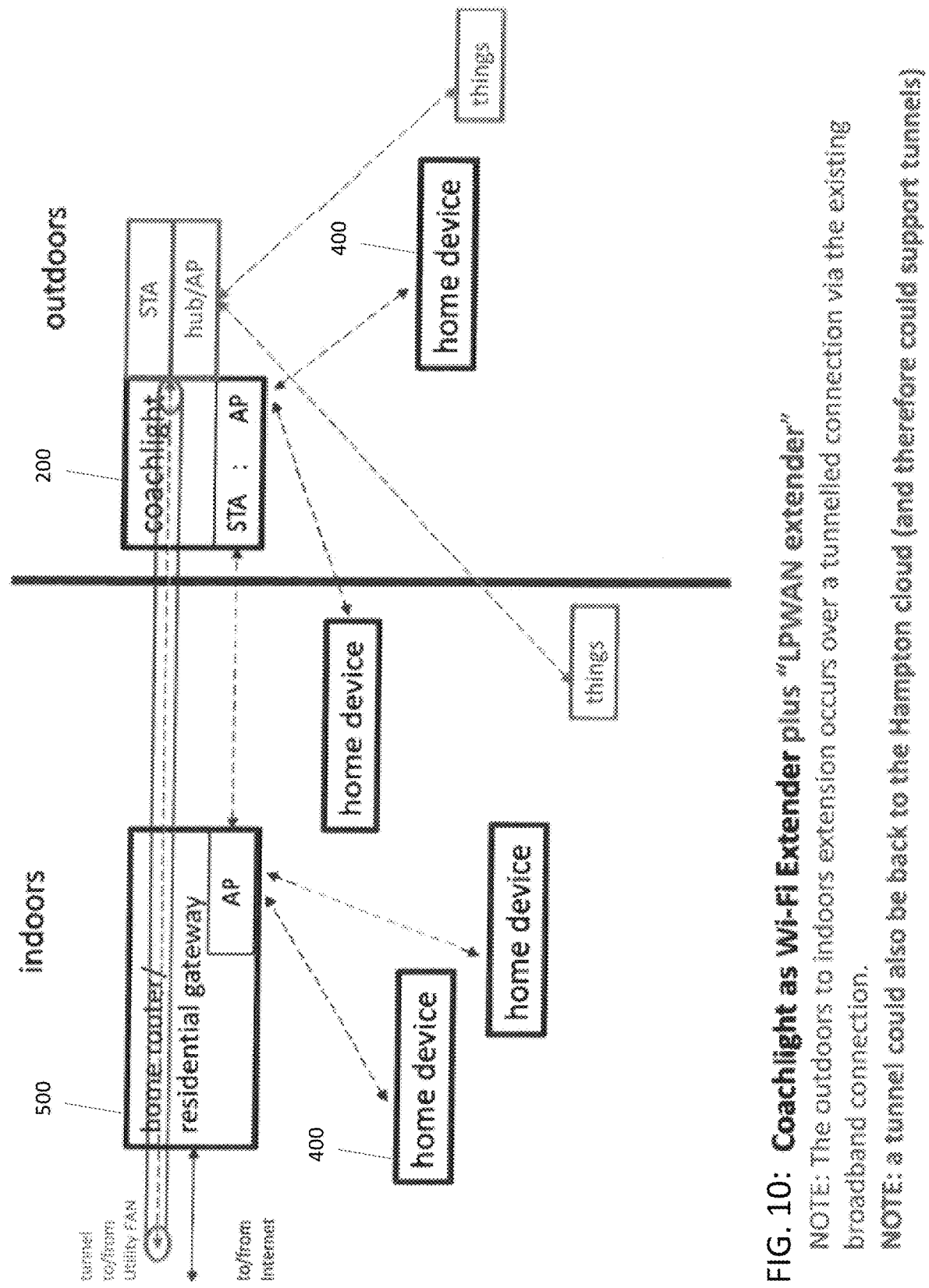
FIG. 10: Coachlight as Wi-Fi Extender plus "LPWAN extender"
NOTE: The outdoors to indoors extension occurs over a tunneled connection via the existing broadband connection.
NOTE: a tunnel could also be back to the Hampton cloud (and therefore could support tunnels)

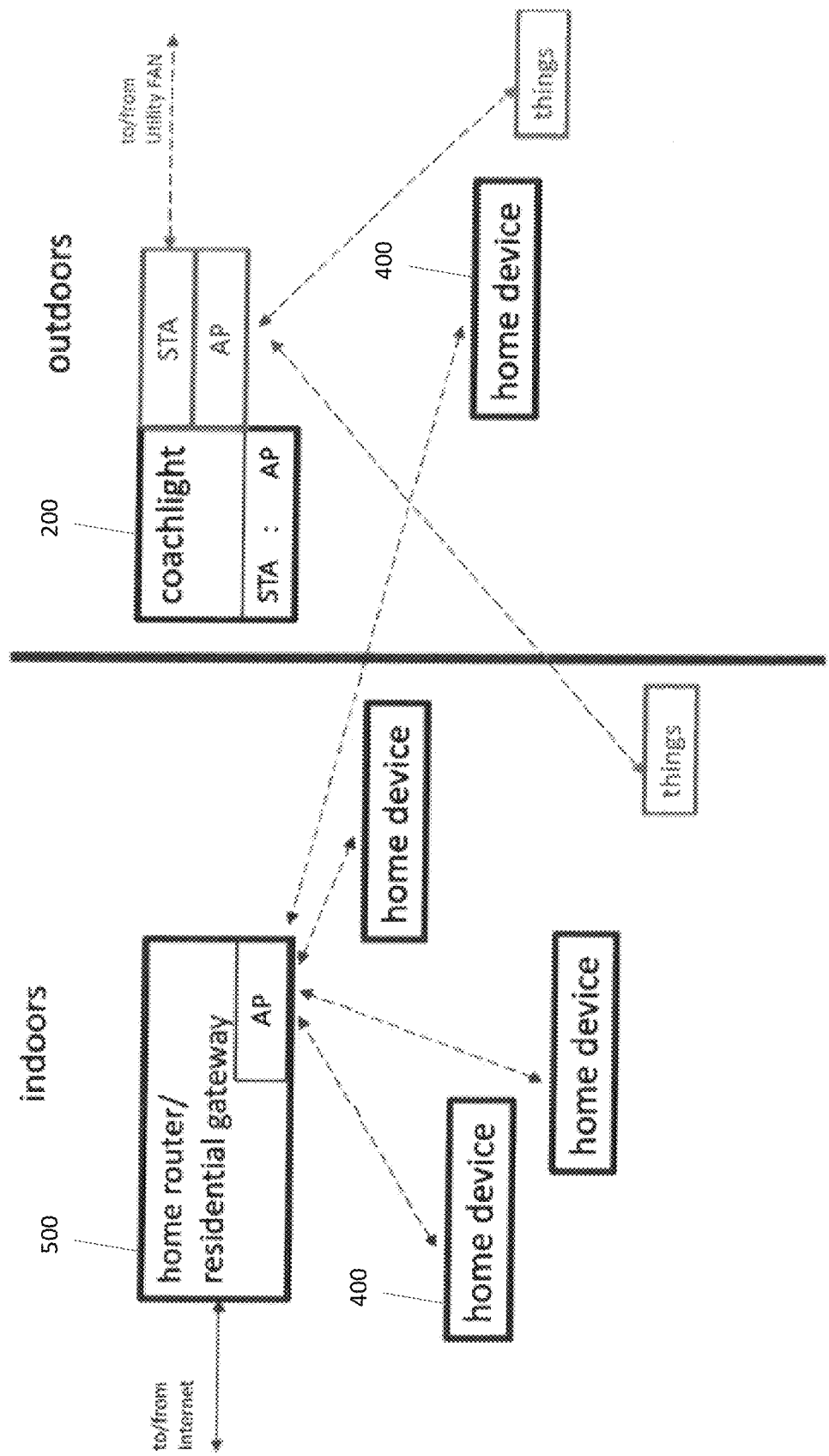
FIG. 11: Coachlight as IoT AP
NOTE: Coachlight does NOT function as an extender

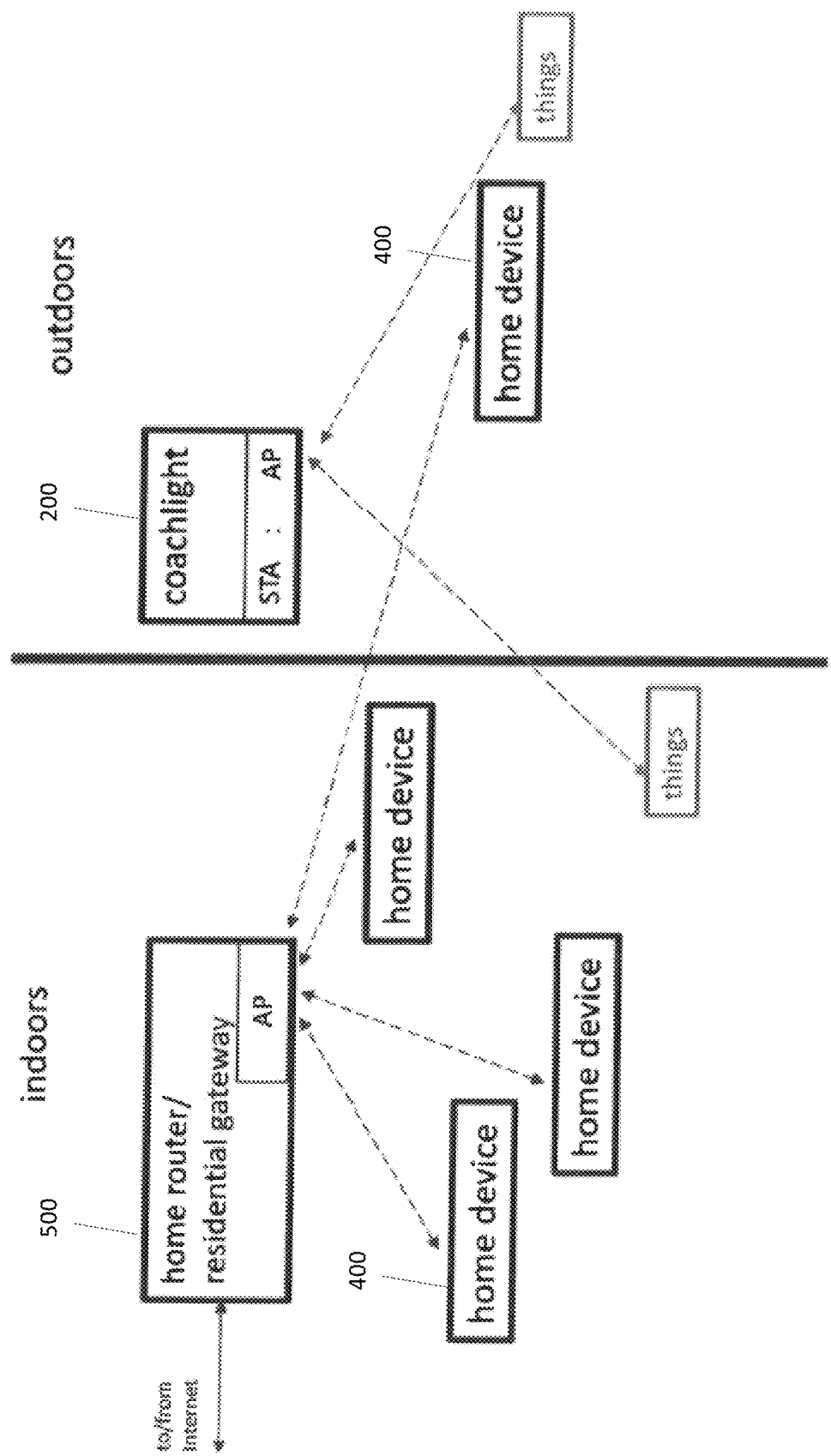
FIG. 12: Coachlight as standalone IoT AP
NOTE: Coachlight is NOT connected to the internet but is only a local, residential WLAN Coachlight could be used "as is"

WIRELESS LAYERED SECURITY SYSTEM

CROSS-REFERENCE TO RELATED APPLICATION

This application claims priority, under 35 U.S.C. § 119(e), from U.S. Provisional Application No. 62/614,231, filed Jan. 5, 2018, the subject matter of which is incorporated herein by reference in its entirety.

FEDERALLY SPONSORED RESEARCH OR DEVELOPMENT

Not Applicable.

BACKGROUND

The present disclosure generally relates to a security system, and more particularly to a system of wirelessly connected integrated security devices with at least one security device being an outdoor device with wireless capability.

People around the world are increasingly reliant on their mobile phone devices and tablets to access the internet by connecting to a network wirelessly. Home devices such as home cameras and home assistants also rely on connection to a wireless network to allow users to view and control the cameras and to command the home assistant. Wireless access to a user's security system provides great convenience and comfort knowing that his or her home is secure and safe. A wireless access point provides such a connection to the wireless network. The shortcoming of wireless access, however, is that the user or the home device must be within a certain range or distance from a wireless access point to connect to the network. If the user moves outside this wireless range, connection to the network is dropped. A wireless range extender or a wireless repeater are devices which can increase the range and coverage of the wireless access point. The wireless extender takes signals from the existing wireless access point and forwards the signals to extend the range and coverage of wireless access. Furthermore, the wireless extender takes signals from devices connected to itself and forwards the signals to the existing access point. However, the wireless extender must be located within range of the wireless access point and plugged into an electrical outlet inside the home. Moreover, a wireless extender is bulky and unsightly, and as such makes it difficult to provide an inconspicuous or hidden location for the device.

SUMMARY

A security system in accordance with an embodiment of the present disclosure includes a plurality of outdoor devices in wired or wireless communication with one another in a shared wireless network. At least one of the outdoor devices is in wired or wireless communication with a wireless access point (e.g., a home router) and functions as a repeater or extender to extend the wireless coverage to other outdoor devices, which could be, for example, Wi-Fi coverage. For simplicity, the outdoor device functioning as a repeater or extender will be called a master device, and any outdoor device that does not serve as a repeater or extender of the wireless signals will be called a peripheral device. The master device extends wireless coverage to provide network access for the peripheral devices and other wireless devices, such as a laptop, mobile phone, or tablet. Thus, the master device "provides" the peripheral devices. The master device may be a wireless repeater with a cellular module for cellular capability. The master device may also accommodate other wireless technology, including Bluetooth. In a residential or commercial setting, there may be more than one master device to provide wireless coverage to one or more peripheral devices. For example, master devices at the front and rear of a home may both provide wireless coverage to a peripheral device at a side of the home.

The master device can be generally wired to a constant power supply, such as an electrical outlet, or hardwired to the home's electrical system to ensure that sufficient power is provided for extending the wireless coverage of the home router, and it may have a backup battery in case of a power failure. Alternatively, the master device can be battery powered and/or solar powered to recharge the battery.

In an embodiment of the present disclosure, the master device can be an outdoor light fixture, such as a coach light, which can include a light fixture housing, a lamp, a driver configured to supply and control power to the lamp, one or more wireless transceivers or radios (e.g., Wi-Fi, Bluetooth, LTE, Z-Wave, Zigbee, and HaLOW) configured to send and receive data (or separate transmitter and receiver), a controller managing network signals and data, and one or more wireless antennas connected to the transceiver. The one or more wireless antennas can be positioned at least partially within the light fixture housing or outside of the light fixture housing. In this embodiment, the outdoor light fixture can provide light to the surroundings and increase the wireless range and coverage of the wireless access point. The outdoor light fixture can provide wireless access to the network by extending the wireless range and coverage outdoors to peripheral devices and other wireless devices, which may be indoors and located nearer to the outdoor light fixture than to the wireless access point. Furthermore, by serving as a wireless extender or repeater, battery powered devices such as a phone or tablet, and outdoor battery powered devices, such as outdoor speakers, cameras, or lighting, located near the outdoor light fixture could reduce electrical power consumption to receive and transmit signals to the wireless network because of the shorter distance to the outdoor light fixture relative to the home router. Thus, the master device can extend the battery life of peripheral devices.

The light fixture may also include a camera to record image data which can be transmitted to a wireless device such as a phone, tablet, and personal assistant. The camera may be fixed, or it can be movable to pan, tilt, and/or zoom. Control of the camera can be performed by a user through a wireless device or automatically.

The light fixture may also include a speaker and a microphone to provide audio communication, such as an intercom.

Another aspect of the present disclosure includes a security system for use with a wireless access point that is configured to transmit a first wireless signal within a predetermined transmission range. The security system can comprise an outdoor lighting fixture including a master wireless transceiver configured and located to receive the first wireless signal from the wireless access point and to re-transmit the first wireless signal beyond the predetermined transmission range, and a first peripheral device located and configured to receive the first wireless signal re-transmitted from the master wireless transceiver, and to transmit a second wireless signal to at least one of (a) the wireless access point via the master wireless transceiver, and (b) a second peripheral device.

The outdoor lighting fixture can include a camera that is controllable in response to the first wireless signal transmitted by the wireless access point.

The outdoor lighting fixture can also include audio components that are controllable in response to the first wireless signal transmitted by the wireless access point.

The peripheral device can include a peripheral wireless transceiver configured to receive the first wireless signal and to transmit the second wireless signal.

The peripheral device can include a device selected from the group consisting of one or more of a mobile phone, a tablet device, a laptop computer, a camera, a lighting fixture, an electronic deadbolt, an electronic personal assistant device, and a peripheral wireless transceiver.

The peripheral device can be one of a plurality of peripheral devices, each of which is configured to receive the wireless signal re-transmitted from the master wireless transceiver.

Another aspect of the present disclosure includes an outdoor lighting fixture, which can comprise a housing containing an illumination element, a master wireless transceiver in the housing configured to receive a wireless signal from a wireless access point having a predetermined transmission range, and to re-transmit the wireless signal beyond the predetermined transmission range of the wireless access point, and a camera configured for wireless communication with the wireless access point via the master wireless transceiver.

The outdoor lighting fixture can also include audio components configured to provide an intercom in wireless communication with the wireless access point.

The wireless signal from the wireless access point can be a first wireless signal, and the camera can be configured for communication with the wireless access point via a second wireless signal.

The master wireless transceiver can be configured for receiving the second wireless signal and for re-transmitting the second wireless signal to the wireless access point.

Yet another aspect of the present disclosure includes a lighting fixture, which can comprise a housing supporting an illumination element, a power controller disposed within the housing and coupled to a power supply and the illumination element, the power controller configured to control power to the illumination element, and a camera module disposed within the housing and coupled to the power controller.

The camera module can include a camera configured to capture image signals, a microphone configured to capture incoming audio signals, a speaker configured to output outgoing audio signals, and a transceiver configured to send the image signals and incoming audio signals and receive the outgoing audio signals from a wireless access point having a predetermined transmission range.

The transceiver can be further configured to receive and re-broadcast the wireless signals to a peripheral device.

The camera module can further comprise a passive infrared detector to sense motion.

The camera module can further comprise an ambient light detector.

The camera module can send signals to the power controller to control the power to the illumination element based on signals received from the passive infrared detector or the ambient light detector.

BRIEF DESCRIPTION OF THE DRAWINGS

FIGS. 4-12 each show a different embodiment of the outdoor device of FIG. 1 within a wireless network system.

DETAILED DESCRIPTION

The detailed description set forth below in connection with the appended drawings is intended as a description of the presently preferred embodiments of the light fixture provided in accordance with aspects of the present components, assemblies, and method. It is not intended to represent the only forms in which the present components, assemblies, and method may be constructed or utilized. The description sets forth the features and the steps for constructing and using the embodiments of the present components, assemblies, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
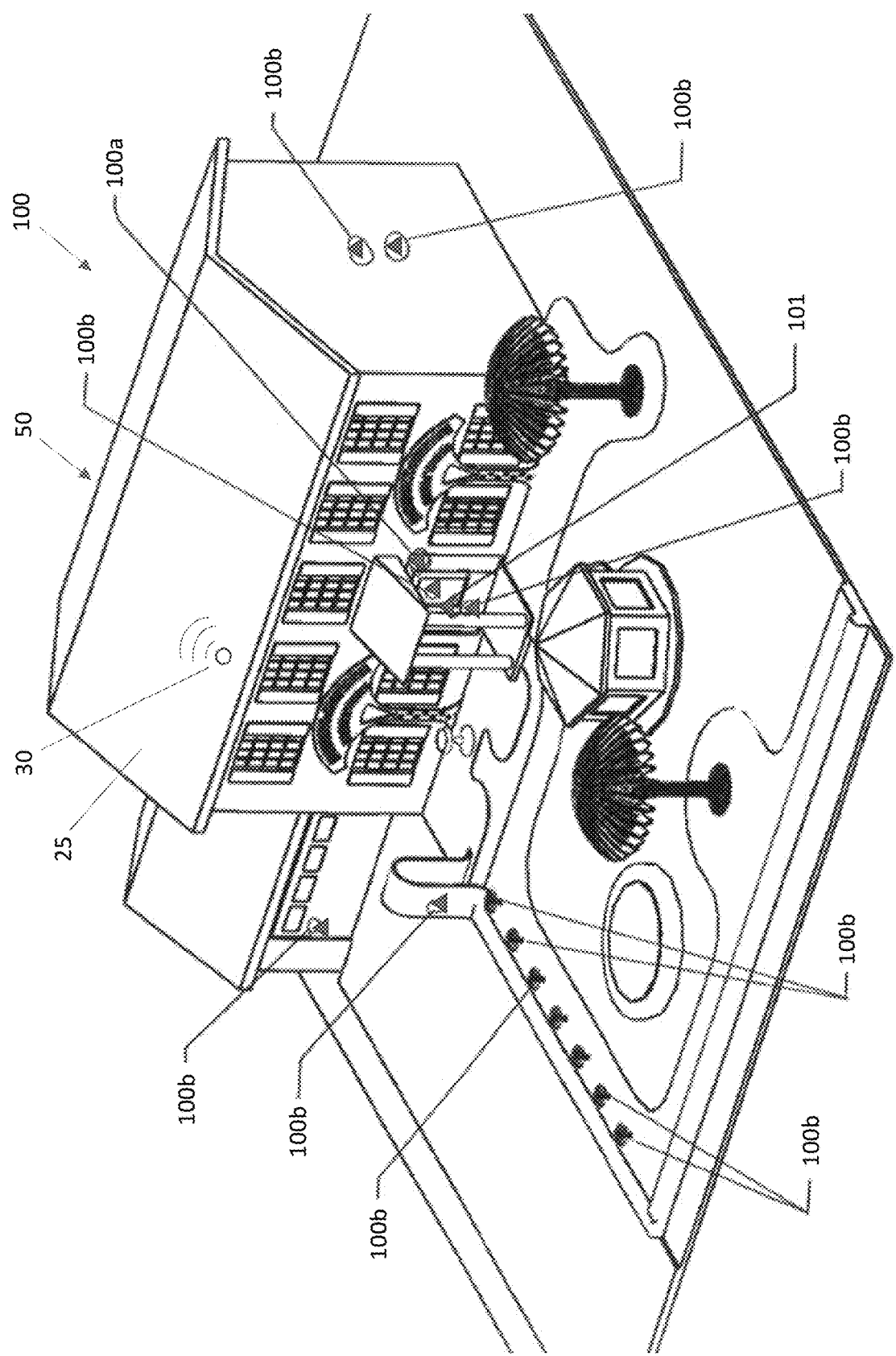
FIG. 1 shows an embodiment of a wireless layered security system applied in a residential setting.
Figure 2C:
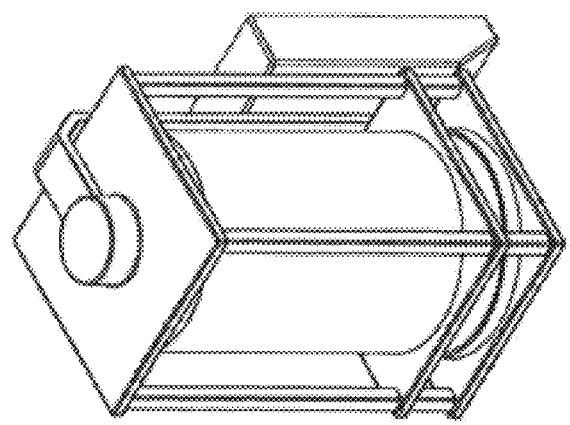
FIGS. 2A-2C are various views of an embodiment of an outdoor device shown as a coachlight.
Figure 2B:
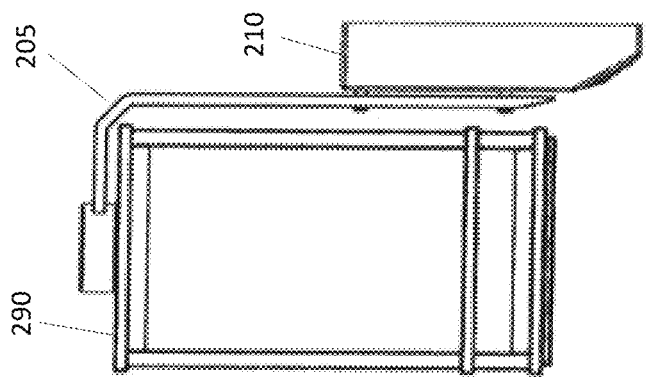
Figure 2A:
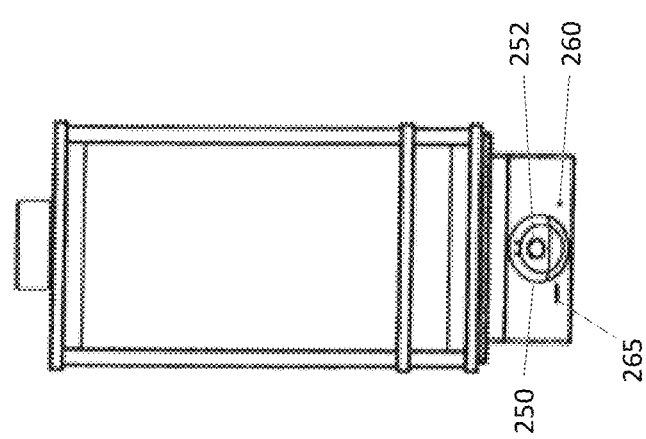
Figure 2D:
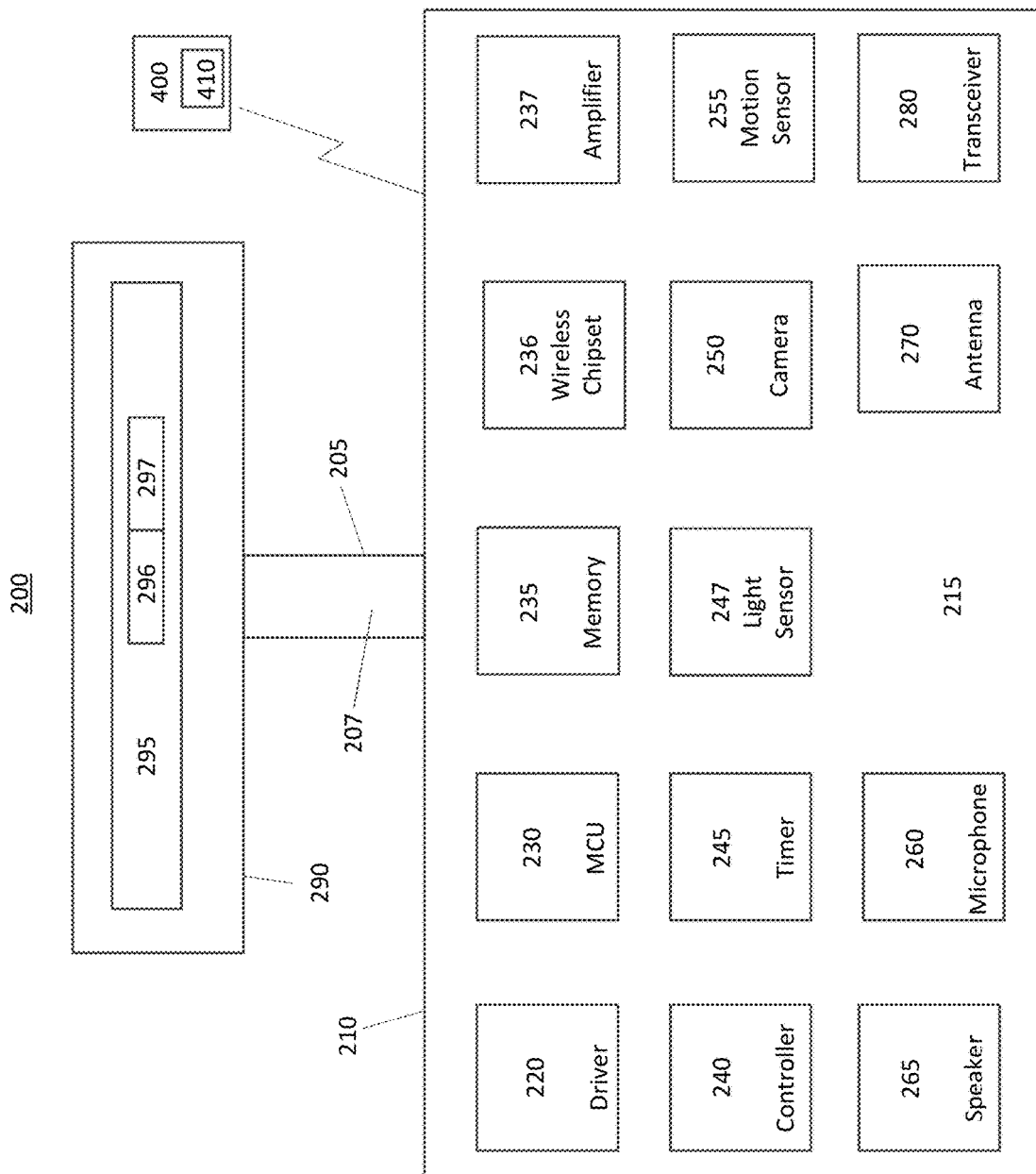
FIG. 2D is a schematic diagram of an embodiment of a coachlight.

FIG. 1 shows an embodiment of a wireless layered security system 50 for use with a structure or building, such as a residential home 25. The wireless layered security system 50 includes a plurality of outdoor devices 100 in wired or wireless communication with one another located outside of the home 25, remote from a wireless access point 30 originating from inside the home 25. The wireless access point 30 may be or include a Wi-Fi router, as discussed below. The plurality of outdoor devices 100 includes at least one master device 100a and can include at least one peripheral device 100b. The master device 100a is located within a predetermined transmission range of the access point 30, and it can function as a repeater or extender to extend the wireless coverage to provide network or internet access for the peripheral device(s) 100b and, advantageously, other wireless and outdoor devices, such as a laptop computer, mobile phone, or tablet, by taking the wireless signals from an existing wireless access point or router 30, amplifying the wireless signals, and forwarding the wireless signals to create another network. The master device 100a can be a wireless repeater; it may have a cellular module for cellular capability; and it may accommodate other wireless technology, including Bluetooth.

Because more power may be needed to provide this repeater functionality, the master device 100a may be wired to a constant power supply, such as an AC electrical outlet, or it may be hardwired to the home's electrical system to ensure that sufficient power is consistently provided for extending wireless coverage. In the event of a power failure, the master device 100a may have or be connected to a backup battery. Conceivably, the master device 100a may also be battery powered with or without solar power cells to recharge the battery. The peripheral device 100b communicates with the master device 100a or another peripheral device 100b, and it may or may not function as a repeater. In some cases, a constant power supply may not be needed, in which case, these peripheral devices 100b can be battery powered. An example of a master device 100a may be a front porch light, coachlight, or security light, which may or may not have a camera and/or an intercom system (e.g., microphone and speaker) for added security and convenience. An example of a peripheral device 100*b* may be a security light, peephole camera, electronic/digital deadbolt door lock 101, outdoor speaker, remote camera, path lighting, gate sensor, and other remote sensors. Each of these peripheral devices 100*b* could rely on the master device 100*a* or another peripheral device 100*b* for access to the internet if the home router is unable to reach these devices 100*b*. In some cases, it may be advantageous to have the peripheral device(s) 100*b* as close as possible to the master device 100*a*, or to minimize any barriers between the devices that may diminish the wireless signals, so as to reduce the power that would be required from the peripheral device 100*b*, thus extending the battery life of the peripheral device 100*b*. For example, if the master device 100*a* is embodied as or in an outdoor lighting fixture (such as, e.g., a coach light or broadly speaking, a lighting fixture), as described below, and the peripheral device 100*b* is embodied in a digital/electronic deadbolt 101 (as described below), receiving and sending Bluetooth or Wi-Fi signals between the digital deadbolt and the fixture would require less power than if the digital/electronic deadbolt were to communicate directly with the home router, because of the short distance and direct line of sight due to the absence of walls and other obstacles between the devices.

There may also be more than one master device 100*a* to provide wireless coverage to one or more peripheral devices 100*b*. For example, if there is a coach light-embodied master device 100*a* at both the front and rear of the home, a security light (i.e., peripheral device 100*b*) at the side of the home could send signals via either or both coach lights. In another example, several master devices 100*a* can be scattered outdoors to create a network of "nodes" at which the peripheral device(s) 100*b* can connect. One or more peripheral devices 100*b* may also function as "extenders" by sending and receiving only certain packets of data, rather than all the data that would be sent and received by a master device 100*a*. A filter in a peripheral device 100*b* could filter out certain data, so that packet forwarding through the peripheral device 100*b* can be selective or topologically dependent.

FIGS. 2A-2D (collectively FIG. 2) illustrates a master device 100*a* embodied as a light fixture 200 (e.g., an outdoor coach light), which can include a light fixture housing 210, a lamp housing 290, a lamp 295 positioned in the lamp housing, a driver 220 configured to supply and control power to the lamp 295, a microcontroller unit ("MCU") 230, control circuitry or controller 240, a camera 250, a microphone 260, a speaker 265, and/or a pair of wireless antennas 270, and a transceiver 280. In the illustrated embodiments, the light fixture 200 can be configured for lighting an area around the light fixture, for providing video surveillance, audio/video communication, and/or for coupling exterior devices to a wireless network.

The light fixture housing 210 can be weatherproof and define an interior space 215, which may be separated into one or more cavities. In one embodiment, the lamp housing is connected to the light fixture housing 210 by a structure, such as an arm 205, coupled to both the light fixture housing 210 and the lamp housing 290. In the illustrated embodiment, the arm 205 extends away from an outward facing surface of the light fixture housing 210 to a side or an end of the lamp housing 290 to support the lamp housing 290 and connect the lamp housing 290 to the light fixture housing 210. Wires may extend through a channel 207 in the arm 205 to supply power to the lamp 295 and other components, which may be on or in the lamp housing 290. In another embodiment, the lamp housing 290 is coupled directly to the light fixture housing 210. In yet another embodiment, the lamp housing 290 and the light fixture 210 form a single unitary structure, in which case the lamp 295 and other components are positioned within an interior of the single unitary structure. The light fixture housing 210 and the lamp housing 290 can be made of a metal, polymer, glass, composite, or a combination of materials. For example, the light fixture housing 210 can be made of a combination of a polymer and metal to allow wireless signals to pass through, and yet be durable enough to cover and protect components of the light fixture therein. The lamp housing 290 can also be made of a combination of materials, such as a metal frame surrounding or supporting a translucent or transparent glass or polymer to allow light emitted from the lamp to pass therethrough.

The lamp 295 may include a socket 296 inside the lamp housing 290 to receive a lighting element 297 (e.g., light bulb) engageable in the socket 296. Alternatively, the lamp 295 itself may be a lighting element or illumination element (e.g., one or more light emitting diodes) configured to emit light. A driver 220 located inside the light fixture housing or lamp housing may be used to regulate power from a power source to the lamp by providing a constant amount of power to the lamp should its electrical properties change with temperature. The power source may be a constant source, such as a home's electrical system, or it may be or include solar cells, one or more batteries, or any combination.

The light fixture may also include a controller 240 or control circuitry located in the light fixture housing 210 or lamp housing 290 to control different lighting configurations for the lamp. In one embodiment, the controller 240 may set different brightness levels of the lamp, depending on the ambient lighting conditions detected by a light sensor 247 and motion detected from the camera 250 (an optic-based motion detector) or other motion sensor 255 (e.g., passive infrared, active infrared, piezo-electric, ultrasonic). For example, the lamp 295 may be set to power on and off at certain times of a day by a timer 245 or triggered on by detection of motion or ambient light by the one or more sensors. These lighting events may be stored in a memory 235 or memory structure, such as a memory card. Software or program instructions for the lighting, among other things (e.g., functions of the camera and managing network signals as explained below), can also be stored in one or more memory structures, and can be executed by the MCU 230 or one or more processors.

The camera 250 or a camera module including the camera 250 is mounted at least partially within the light fixture housing 210 or the lamp housing 290. For example, a lens 252 of the camera 250 may be located or protrude just outside of the light fixture housing. The camera 250 can be fixed to monitor a limited area, or it may be movable to pan, tilt, zoom, and/or shift position to monitor a larger area. IR light produced from, for example, LED's adjacent to or surrounding the lens of the camera 250, can allow the camera 250 to capture images and video when there is little or no ambient light by, for example, switching to a monochrome filter. As shown, the camera 250 is a circular camera mounted just below the lamp housing to capture images above and below the lamp housing. More specifically, the camera 250 can capture images above and below a horizontal plane. However, the location, size, shape, configuration, and type of camera 250 can be selected according to the particular needs and requirements of the user.

The camera 250 may also include a wireless transceiver 280 with an antenna 270 to receive and transmit signals to and from the camera 250 and other components of the light fixture. The information transmitted can be status, control, audio, video, and image information. Thus, the camera 250 can directly transmit status and image or video information captured by the camera 250, and it can receive signals to control the movement, zoom, and other functions of the camera 250. Alternatively, the camera can be connected to a control circuit or controller 240 to manage the signals to and from the camera 250. In one example, when the camera 250 or the motion sensor 255 detects motion, the controller can cause the camera to pan, tilt, and/or zoom to a specific area of the detected motion. The controller can then control the camera 250 to record image and video information of the specific area and save the information in a memory 235, from which the information can then be transmitted wirelessly by an RF or wireless transceiver 280. The controller 240 may also control the camera 250 to send the image and video information in real-time via the wireless transceiver 280. A pair of antennas 270 electrically connected to the transceiver 280 can transmit and receive data to and from the camera 250, as discussed in detail below. The camera 250 may also be used to initially connect the light fixture 200 to the network. For example, a QR code from a controller, such as an app on a smart phone, can be used to pair the light fixture 200 to the Wi-Fi network. The camera may also have face recognition and communicate through Bluetooth.

The motion sensor 255 of the light fixture 200 may be or include an inertial measurement unit (IMU) to sense vibration, and/or a passive infrared (PIR) sensor to sense motion, which, when triggered, can cause the camera 250 to begin recording, or the light fixture 200 may be alerted, for example, to increase power to the transceiver 280.

In combination with, or in place of, the camera 250, a speaker 265 and microphone 260 can provide audio communication through the light fixture 200. The transceiver 280 can transmit audio information from the microphone 260 and receive audio information for the speaker 265. Thus, the microphone 260 and speaker 265 can serve as an intercom or play deterrent sounds, alarms, and/or music. The microphone 260 and speaker 265 can also be used alone or in combination with the camera 250 to pair the light fixture 200 to the Wi-Fi network. Thus, the microphone 260 can be used for audio recognition and analytics.

Commands, signals, and video and audio information from the light fixture 200 can be exchanged with a wireless client device 400, such as a mobile phone, tablet, or personal assistant (e.g., Alexa®, Google Home®) directly, or indirectly, such as through the wireless access point. The wireless client device 400 may be used to view the camera information, listen to the audio information received by the microphone 260, or transmit sound, such as a spoken voice or music through an application 410. The wireless client device 400 may also be used to control the lighting, such as setting up the timer for powering the lamp and controlling the rate of illumination, and it may also control movement of the camera 250, such as panning, tilting, zooming, and recording.

Each wireless client device 400 can be unique to the light fixture, and when the wireless client device 400 is "paired" (or tethered) to the light fixture 200, only that wireless client device can control the light fixture 200 and operate features of the light fixture 200, such as the camera 250, microphone 260, and speaker 265. A wireless client device 400 that is not paired to the light fixture 200 cannot control or operate features of the light fixture 200, even if a correct username and password verifying the owner is entered. This prevents anyone who has improperly, or without authorization, acquired the username and password of the rightful owner, and who is using an unpaired wireless client device 400, from controlling and operating the light fixture 200. Only the wireless client device 400 that has been paired can be used to operate the light fixture 200.

Pairing can be accomplished by combining a unique half of the key from the wireless client device 400 and a uniquely generated key from the light fixture 200. Thus, each pairing key for pairing a wireless client device 400 with the light fixture 200 will be different for each wireless client device 400 and light fixture 200. It should be noted that although pairing a wireless client device 400 is discussed here with a light fixture 200, the wireless client device 400 can pair with any master or peripheral device 100a, 100b of this disclosure, such as a deadbolt, or a wireless device in general, and the details and method of doing so would be similar.

A to-be-paired wireless client device 400 can also be paired to the light fixture 200 through, for example, the app on an already-paired wireless client device 400. This can be accomplished by a pairing code (e.g., an e-key) given to the "to-be-paired" wireless client device by the wireless client device 400 already paired to the light fixture 200. Once the "to-be-paired" wireless client device becomes a paired wireless client device, it can also operate the light fixture 200 and send pairing codes to other wireless client devices 400. Thus, a family of wireless client devices 400, each unique to the light fixture 200 and forming a unique pair, can be generated for each household member. Moreover, any of the paired wireless devices can unpair another paired wireless client device 400 from the light fixture 200, so that if a wireless client device 400 is lost or stolen, that lost or stolen device cannot be used to operate the light fixture 200.

The light fixture 200 may also serve as a wireless extender, repeater, or wireless hub, and if the light fixture is connected to the internet via a cable, it may serve as a wireless access point. The wireless antenna 270 may comprise a pair of wireless antennas, with a first of the pair of wireless antennas 270 configured to transmit and receive wireless signals from a wireless access point, such as a home router, and a second of the pair of wireless antennas 270 configured to transmit and receive wireless signals from a wireless client device 400, such as a mobile phone, tablet, or an outdoor wireless device spaced apart from the light fixture. Alternatively, the light fixture may have separate antennas for transmission and reception. In an example, the light fixture can include an effective multi-antenna (at least 2) design for diversity reception, and an effective multi-antenna (at least 2) design for diversity transmission. An external antenna can be used with the light fixture for improved performance and coverage, in which case, the light fixture would have a connector to connect to the external antenna.

The wireless antennas 270 may be positioned entirely within the interior cavity 215 of the light fixture housing 210 and/or the interior of the lamp housing. Alternatively, the wireless antennas 270 may be positioned at least partially within or outside of the interior cavity 215 of the light fixture housing and/or the interior of the lamp housing. In some embodiments, the antennas 270 may be a part of the structure of the light fixture housing 210, or they may appear as part of an ornamental feature of the light fixture 200. The wireless antennas 270 may be directional or omni-directional. In one embodiment, the first wireless antenna is configured to transmit or receive wireless signals along a first direction to one or more wireless access points, such as a home router or another extender or repeater. The first antenna may be adjustable automatically or by a user to better focus the RF energy in a particular direction. The second wireless antenna is configured to transmit or receive wireless signals along a second direction to another wireless device, such as a mobile phone, tablet, a device located outside the home, away from the light fixture, or to another extender or repeater, another lighting fixture, a master or peripheral device 100a, 100b, or a low-powered wireless device located near the light fixture, such as a Bluetooth device or other battery powered device. Similarly, the second wireless antenna may be adjustable automatically or by a user to better focus the RF energy in the second direction, such as approximately opposite the first direction or towards a desired area. Thus, the light fixture 200 may serve as a wireless extender, a wireless hub, or a wireless access point, so that devices outside of the home can be coupled and connected to the wireless network via the light fixture 200. In one example, the Wi-Fi output power levels can be configurable between a minimum power (e.g., 30 mW) and a maximum power available from the light fixture 200. The light fixture 200 can also support the manual or automatic adjustment of transmitted radio power levels.

The light fixture 200 also includes one or more processors or microcontroller units (MCUs) 230 and memory 235 (e.g., RAM and/or ROM) to store and run firmware of the light fixture 200, control network traffic, and handle other device functions. The light fixture 200 may also include one or more radios or RF transceivers 280 to handle wireless communication, as shown in FIGS. 4-12, a wireless chipset 236, and one or more amplifiers 237. The light fixture may also include an ethernet port, USB port, audio output, or other I/O, to connect to an external antenna, or it may include a recharging port for its battery power source (if any). In one embodiment, more than one processor 230 may be used to send and receive network information. For example, a separate processor (or state machine) may be used to handle receiving operations (i.e. packets received by an RNIC processor), and another processor or state machine may be used to handle outgoing operations (i.e., packets transmitted by the RNIC).

Since the light fixture provides an "extension" of the pre-existing home Wi-Fi network, the traffic destined to/originating from devices associated with the Wi-Fi network established by the light fixture can be transparently forwarded from/to the pre-existing home Wi-Fi network associated with the light fixture, which means that payload in 802.11 data frames is not modified. Examples of payload include TCP/IP data, DHCP messages, etc. Therefore, it is not expected that 802.11 control and management frames are forwarded between the Wi-Fi networks. Thus, the light fixture can interoperate with proprietary mesh networks. That is, the traffic forwarding can occur when the light fixture is connected to a pre-existing home Wi-Fi network that is implemented via a proprietary mesh network.

Figure 3C:
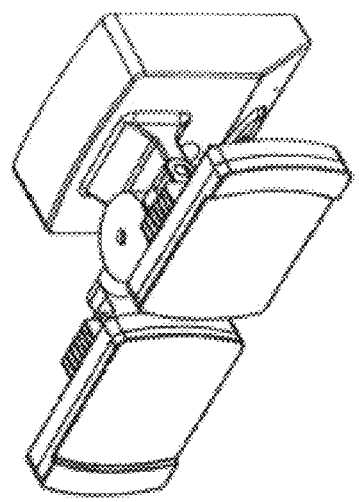
FIGS. 3A-3C are various views of one embodiment of a peripheral device 100b shown as a security light with a camera.
Figure 3B:
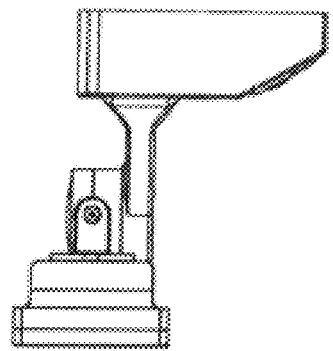
Figure 3A:
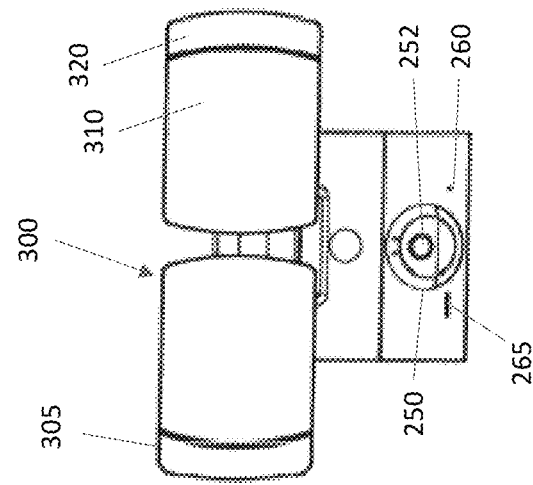

In FIGS. 3A, 3B, and 3C, the master device 100a is embodied as a security light 300 with an optional camera 250. The security light 300 may, instead, be a peripheral device 100b (e.g., without Wi-Fi extender capability). FIG. 3 includes at least one lamp 305, and preferably two lamps 305, each of which may advantageously include two sets of LEDs, with a first LED set 310 providing illumination when ambient light is below a certain threshold (e.g., too dark) or a certain time of the day is reached, and a second LED set 320 providing illumination when motion is detected. As shown, the first set 310 of LEDs is located at the edge of the lamp(s) 305, marked by a raised portion, and the second set 320 of LEDs is positioned adjacent the first set 310 of LEDs forming a larger portion of the total LEDs. The security light 300 may include the some or all of the features described above with reference to the lighting fixture 200 of FIGS. 2A-2D. The security light may be powered by the home's AC electrical system, with or without a battery backup, or it may be battery-powered with solar cell recharging.

FIG. 4 is a diagram illustrating one embodiment of an outdoor device as a Wi-Fi extender of an indoors Wi-Fi network. In this diagram, this outdoor device is a coach light as, for example, depicted in FIG. 2. As shown, a home router or residential gateway 500 is located inside the home. The home router serves as a wireless access point ("AP") for all wireless devices including home devices, both indoors and outdoors, within the coverage area of the Wi-Fi network. Simply, the home router 500 connects wireless devices 400 to each other and to the Internet. Wireless devices 400 outside the coverage area of the Wi-Fi network would not have access to the Wi-Fi network, because the distance is too great for a direct connection to be established. An outdoor device, shown as a coach light in FIGS. 4-12, with a wireless repeater capability can extend the range and expand the original coverage area by taking the Wi-Fi signal from the home router, amplifying the Wi-Fi signal, and forwarding the Wi-Fi signal, thereby forming a coverage area outdoors beyond the original coverage area. Furthermore, the wireless repeater takes signals from devices connected to itself and forwards the signals to the existing home router 500. Thus, the outdoor device should be placed at a location within the original coverage area of the Wi-Fi network. The outdoor device with wireless repeater capability functions as both a station ("STA") connecting to an access point (e.g., home router) and an access point enabling other wireless devices to connect to it. Thus, the coach light can be described as a back-to-back STA and AP with a network processor (CPU) as controller between the STA subsystem and AP subsystem. The STA subsystem supports the primary functionality of the coach light (i.e., video camera, microphone, lamp). The STA subsystem and the AP subsystem together support the secondary functionality of the coach light (i.e., extension of the pre-existing home Wi-Fi network). If there are no externally located STAs associated with the AP subsystem, the STA subsystem is capable of functioning separately in support of the camera/microphone/lamp functionality.

The outdoor lighting fixture 200 can be connected to the Wi-Fi network using another wireless device 400 already connected to the Wi-Fi network, such as a smart phone, tablet, or laptop computer, as the controller or configurator. In one embodiment, the camera, the microphone, and/or the speaker of the outdoor fixture 200 can be used to link the outdoor fixture 200 to the network.

FIG. 5 illustrates another embodiment of a coach light as a Wi-Fi extender, similar to the embodiment shown in FIG. 4, but with cellular capability, such as Long-Term Evolution (LTE) capability. In this embodiment, the coach light 200 can connect wireless devices 400 within its coverage area to the internet through the home router 500 or a cellular modem 510 (e.g., LTE modem), or both (i.e., inverse multiplexing). Thus, the outdoor wireless devices 400 (or indoor devices located near the coach light) will always be connected to the internet through either or both of these two paths.

FIG. 6 shows one embodiment of an outdoor device as a Wi-Fi extender of an outdoors Wi-Fi network. The outdoor device 200 (e.g., coachlight) functions as a Wi-Fi extender/transceiver transmitting and receiving data in the unlicensed spectrum to and from an external source to connect the wireless devices 400 to the internet. Transmitting and receiving can occur, for example, in the millimeter wave spectrum.

FIG. 7 is another embodiment of an outdoor device or coach light 200 as a Wi-Fi extender similar to the embodiment of FIG. 6, except licensed spectrum is used to connect to the internet rather than transmitting and receiving data in the unlicensed spectrum.

FIG. 8 is another embodiment of an outdoor device or coach light 200 as a Wi-Fi extender with Field Area Network (FAN), which connects the coach light 200 to a private network operated and/or managed by a utility provider. In this way, the coach light 200 acts as a station for the utility provider. A separate module comprising a radio and a processor provides wireless connectivity to the FAN, and acts as a hub for things which have dedicated functionality, such as a sprinkler and electric meter.

FIG. 9 illustrates another embodiment of an outdoor device or coach light 200 as a Wi-Fi extender and Low-Power Wide-Area Network ("LPWAN") operating in either licensed and unlicensed LTE or in Wi-Fi using different frequency bands.

FIG. 10 is another embodiment of the outdoor device or coach light 200 as a Wi-Fi extender, similar to the embodiment of FIG. 9, except that the outdoors to indoors extension occurs over a tunneled (logical) connection to another logical connection via the existing connection through the wireless access point.

FIG. 11 is an embodiment of an outdoor device or coach light 200 which functions as an Internet-Of-Things ("IOT") access point with Field Area Network (FAN), as discussed above for FIG. 8. Here, the coach light 200 is not connected to the internet through the home router.

FIG. 12 is an embodiment of an outdoor device or coach light 200 which functions as an Internet-Of-Things ("IOT") access point, except without Field Area Network (FAN).

A peripheral device 100*b* may be mounted to a door of the house, embodied, for example, in an electronic or digital deadbolt that uses a battery as its source of power. The deadbolt therefore could benefit from the wireless coverage provided by an adjacent master device 100*a*, such as the outdoor device (coach light) 200. The deadbolt may have a solar cell/panel to recharge the battery, the solar panel being either integral to the deadbolt or separate from the deadbolt. The deadbolt may be or include a mechanical lock, operated by a motor that is electronically controlled, or it may be operated manually. In either case, the status of the deadbolt may be communicated wirelessly to the master device 100*a* (e.g., the outdoor device 200).

The deadbolt can have a latch sensor, that may be or include a magnetometer, and that determines whether the door is closed. The magnetometer is first calibrated, and the value recorded when the door is in the closed position. Any deviation from that value could indicate the door is not in the closed position. In combination with the magnetometer may be at least one electromechanical switch pivoting around the doorknob shaft or fixed about the doorknob and making contact with the doorknob at the locked and/or unlocked position to indicate the status of the lock and the door.

The deadbolt can communicate via Bluetooth or Wi-Fi. Status of the deadbolt can be determined from an application on a smart phone or tablet or by voice command through a home assistant. Capabilities of the deadbolt may include geo-fencing, which can unlock the door when a connected phone or device is within range of the deadbolt.

The deadbolt can also have an outward facing camera similar to the camera described above for the light fixture (e.g., face recognition, HDR, LDC with digital PTZ, IR LED for night vision, PIR sensors for wake-up on motion detection, and connecting the deadbolt to the network), and/or a speaker and a microphone similar to that described above for the light fixture. The speaker and microphone can function as an intercom and used for deterrence by sounding alarm or voice responses.

Other peripheral device 100*bs* include path lighting or remote sensors, which can have IMU or PIR sensors to extend detection range and early detection depending on the placement of the remote sensors. A microphone can be used for audio recognition and analytics, and siren/speaker can be provided for alarm or deterrent sounds. This can be useful, for example, to prepare the master device 100*a* to increase power to the radio and transceiver, increase Wi-Fi range and coverage, and/or prepare for recording or triggering an alarm.

Although Wi-Fi and cellular communications are discussed in this disclosure, it is contemplated that the devices and the wireless network that these devices operate can occur in other licensed and unlicensed spectrums, such as 5G.

What is claimed is:

1. A security system for use with a wireless access point that is configured to transmit a first wireless signal within a predetermined transmission range, the security system comprising:
   a first outdoor lighting fixture including a master wireless transceiver configured and located to receive the first wireless signal from the wireless access point and to re-transmit the first wireless signal beyond the predetermined transmission range; and
   a second outdoor lighting fixture including a peripheral wireless transceiver located and configured to receive the first wireless signal re-transmitted from the master wireless transceiver, and to transmit, in response to the re-transmitted first signal, a second wireless signal to at least one of (a) the wireless access point via the master wireless transceiver, and (b) a peripheral device.

2. The security system of claim 1, wherein the first outdoor lighting fixture includes a camera that is controllable in response to the first wireless signal transmitted by the wireless access point.

3. The security system of claim 1, wherein the first outdoor lighting fixture includes audio components that are controllable in response to the first wireless signal transmitted by the wireless access point.

4. The security system of claim 1, wherein the peripheral device is selected from the group consisting of one or more of a mobile phone, a tablet device, a laptop computer, a camera, a lighting fixture, an electronic deadbolt, an electronic personal assistant device, and a peripheral wireless transceiver.

5. The security system of claim 1, wherein the peripheral device is one of a plurality of peripheral devices, each of which is configured to receive the second wireless signal.

* * * * *